(12) United States Patent
Sandelius

(10) Patent No.: US 7,508,470 B2
(45) Date of Patent: Mar. 24, 2009

(54) TRANSFLECTIVE DISPLAY

(75) Inventor: Thomas Sandelius, Staffanstorp (SE)

(73) Assignee: Sony Ericsson Mobile Communications AB (SE)

( * ) Notice: Subject to any disclaimer, the term of this patent is extended or adjusted under 35 U.S.C. 154(b) by 631 days.

(21) Appl. No.: 10/533,351

(22) PCT Filed: Oct. 30, 2003

(86) PCT No.: PCT/EP03/12075

§ 371 (c)(1),
(2), (4) Date: Apr. 29, 2005

(87) PCT Pub. No.: WO2004/040360

PCT Pub. Date: May 13, 2004

(65) Prior Publication Data

US 2006/0028835 A1    Feb. 9, 2006

Related U.S. Application Data

(60) Provisional application No. 60/424,623, filed on Nov. 7, 2002.

(30) Foreign Application Priority Data

Nov. 1, 2002    (EP) .................................. 02024307

(51) Int. Cl.
G02F 1/1335    (2006.01)
(52) U.S. Cl. ........................ 349/114; 349/106; 349/113
(58) Field of Classification Search ................ 349/106, 349/113, 114, 61; 345/88; 362/561
See application file for complete search history.

(56) References Cited

U.S. PATENT DOCUMENTS 6,172,723 B1    1/2001    Inoue et al.
2001/0020990 A1    9/2001    Moon
2001/0045560 A1    11/2001    Bijlsma ........................ 257/72
2001/0052948 A1    12/2001    Okamoto et al.
2002/0145688 A1    10/2002    Sekiguchi
2002/0191134 A1*    12/2002    Funahata et al. ............ 349/113

FOREIGN PATENT DOCUMENTS

JP    2000267077    9/2000
JP    2001033768    2/2001

OTHER PUBLICATIONS

Chinese Office Action corresponding to application No. 200380102584.3, dated May 11, 2007.

(Continued)

Primary Examiner—Dung Nguyen
Assistant Examiner—Tai Duong
(74) Attorney, Agent, or Firm—Myers Bigel Sibley & Sajovec, PA

(57) ABSTRACT

A display unit for a portable electronic device includes a substantially transparent display layer having a front side for displaying information and a rear side, a color filter layer, a reflector, and a lighting system for illuminating the substantially transparent display from the rear side. The reflector is provided on a front side of the color filter layer facing a user, such that reflected light does not have to travel through the color filter layer. When the lighting system is switched on, the display unit operates in an emissive mode, and when the lighting system is switched off, the display unit operates in a reflective and/or transflective mode. The display unit thereby provides two modes of operation that combine peak performance of an emissive display with a transflective ability to be read without backlighting. In this way, a display is provided which has saturated colors and high luminance, and which is still possible to be read in strong sunlight.

18 Claims, 2 Drawing Sheets

OTHER PUBLICATIONS

European Office Action corresponding to application No. 02024307.7-2205, dated Mar. 6, 2007.

International Preliminary Examination Report for PCT/EP03/12075.

International Search Report for PCT/EP03/012075.

* cited by examiner

TRANSFLECTIVE DISPLAY

RELATED APPLICATIONS

The present application is a 35 U.S.C. §371 national phase application of PCT International Application No. PCT/EP2003/012075, having an international filing date of Oct. 30, 2003 and claiming priority to European Patent Application No. 02024307.7, filed Nov. 1, 2002, and U.S. Provisional Application No. 60/424,623 filed Nov. 7, 2002, the disclosures of which are incorporated herein by reference in their entireties. The above PCT International Application was published in the English language and has International Publication No. WO 2004/040360.

TECHNICAL FIELD

The present invention relates to a display unit, and a portable electronic device comprising such display units.

BACKGROUND OF THE INVENTION

Today, in the world of portable electronic devices provided with displays there is a trend towards color displays. This trend is also very much present in the world of mobile communications, where more and more customers demand portable communcation devices having such displays. Typically such displays are of transparent type being illuminated by a lighting system, typically by a backlighting system. Examples of displays are different types of LCDs (Liquid Crystal Displays).

The display should be bright with good contrast. However, the power consumption of the lighting system (typically the backlighting) is high, thereby limiting the time the display can be switched on (herein, the term "switched on" means illuminated) in a portable electronic device. Typically an LCD itself consumes about 0.5 mA in a so-called "standby-mode" and about 80 mA with backlight switched on. Of course, this consumes battery power, hence reducing operating time of the portable electronic device.

Therefore, prior art technology has tried to reduce this problem. One way is to provide a colour filter that has a reflector behind for reflective operation. Ambient light then passes the colour filter and is reflected back, once more passing the color filter. However, this solution implies that reflected light (ambient light) has to travel through the color filter. Moreover, the reflector also reduce the area of the coluor filter during transmission of light, typically from a backlighting system. Since a typical colour filter may absorb more than 70% of the light this is often not a most desirable solution. There are also purely transmissive displays, wherein light is only transmitted from backlighting. Such solutions could for instance be found in lap-tops. However, these solutions provides poor out-door performance, hence in strong sun-light it could be hard, or even impossible to see any information on the display. Therefore, often also this solution does not perform well in out door use.

In US-A1-2001/0045560 (Bijsma et al) there is disclosed partly covering reflective parts of electrodes in a transfiective display with color filters, whereby the color point is adjusted.

However, there still exists problems with prior art that have to be overcome, or at least reduced.

SUMMARY OF THE INVENTION

According to an aspect, the present invention seeks to solve the problem of providing a display unit, in particular a colour display unit that does not consume a large amount of power, and that combines peak performance of an emissive display together with an ability to be read without lighting.

According to a preferred embodiment of the invention, this problem is solved by a display unit for a portable electronic device, comprising:

an essentially transparent display layer having a front side provided for displaying information, and a rear side, a lighting system for illuminating the transparent display from the rear side, said lighting system being adapted to be switched on, or off, wherein when the lighting system is switched on, the display unit is adapted to operate in an emissive mode, when the lighting system is switched off, the display unit is adapted to operate in a reflective or a transfiective mode.

Preferably, the display layer on the rear side is provided with a color filter layer having a front side facing the display layer, said front side being provided with at least one reflector.

Herein, the term "front side" is referred to as any side directly facing a user, even after processing.

Preferably, the reflector(s) covers less than 50% of the total area of the rear side of the color filter layer.

Preferably, the reflector(s) covers less than 25% of the total area of the front side of the filter layer.

Preferably, the reflector is provided in the center of the front side of the filter layer.

Preferably, the reflector(s) is/are provided adjacent to an edge of the front side of the filter layer.

Preferably, the reflector has rectangular shape.

Preferably, the reflector has circular shape.

Preferably, the reflector is made of particles.

According to another preferred embodiment of the invention, there is provided a portable electronic device comprising:

a display unit, comprising:

an essentially transparent display layer having a front side provided for displaying information, and a rear side, a lighting system for illuminating the transparent display from the rear side, said lighting system being adapted to be switched on, or off, wherein when the lighting system is switched on, the display is adapted to operate in an emissive mode, when the lighting system is switched off, the display is adapted to operate in a reflective mode.

With the proposed invention, there is excellent emissive (transmissive) mode, legibility is better in out-door usage and legibility remains when lighting, typically backlighting is switched on, rendering great emissive performance.

These and other aspects and advantages of the invention will in the following be apparent from and elucidated with reference to the embodiments described hereinafter.

BRIEF DESCRIPTION OF THE DRAWINGS

FIG. 2b illustrates the same display unit as illustrated in FIG. 2a, wherein FIG. 2b shows a situation when the lighting system is switched on, i.e. when the display unit operates in emissive mode.

DETAILED DESCRIPTION OF THE INVENTION

Figure 1:
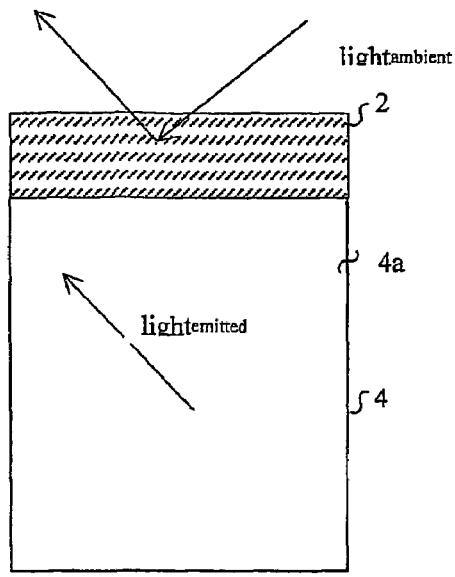
FIG. 1 is a plan view of part of a display unit (a red, green, blue pixel) according to an embodiment of the invention.

Now is referred to FIG. 1, which is a plan view of part of a display unit 1 (herein a sub-pixel) according to a first embodiment of the invention. For purpose of simplicity, the display unit 1 is shown without an essentially transparent display layer, which in this particular case could be a conventional liquid crystal (LC) layer of a liquid crystal display (LCD). Of course also other types of essentially transparent layers that can be employed for presenting information could be used without departing from the invention. Since the operation of an LCD is well known from prior art, the operating principle thereof will not be explained in detail.

The display unit 1 further comprises a reflector 2 provided thereon, in this embodiment of rectangular shape provided at an upper part of a front side 4a of a color filter layer 4. Herein, the term "color filter layer" is referred to as a layer of suitable thickness and composition comprising a color filter of conventional type. Since such filters are well known from prior art, the composition of this layer will not be described in more detail.

Preferably, the reflector 2 covers less than 50%, in particular less than 25% of the total area of the front side 4a of the filter layer 4. The area selected depends on performance that is desired. A large area implies a larger reflection area for ambient light, but, also reduces emissive (transmissive) performance of the display unit 1, since area for transmission of light from lighting system is reduced. Therefore, a balance between these requirements has to be taken into account. To select area of reflector is obvious for a person skilled in the art to achieve, for instance by experiments, and will therefore not be described in more detail herein.

Herein, only one out of three sub-pixels is shown because of simplicity. Typically, a color display pixel contains three sub-pixels, one for each color (red, green and blue). This will not be further described, since it is conventional technique for color display pixels. It is also known that each pixel (sub-pixel) can be able to have a reflective and a emissive mode of operation. Herein, the term "reflective mode" means a mode of operation using reflected light from ambient light, and the term "emissive mode" means a mode of operation using transmitted light from a lighting system, typically from a backlighting system. The term "emissive" does not only relate only to a pure emissive operation, but also to almost a pure one. Both of these operating modes will be further explained below, when describing the operation of the display unit according to different embodiments of the invention.

Furthermore, because of simplicity, in this figure, lighting will only be schematically described, since a more detailed explanation will follow below with reference to FIG. 2a-b. Now, again turning to FIG. 1, it is shown how ambient light $light_{amb}$ is reflected against the reflector 2 (illustrated by two arrows, of which one is incoming and the other is going out from the reflector 2). The reflector 2 can be made of any suitable type of reflecting material such as metals, for instance aluminium, silver, metal coated polymer material, or the like. The reflector can also be made from the color filter layer 4 by means of conventional techniques using masks etc. The material in itself is not essential for the invention, only its function as reflector. The emitted $light_{lightemitted}$ is illustrated by an arrow going out from the front side 4a of the color filter layer 4.

With this solution, the display unit is adapted to operate in an emissive mode, when the lighting system is on, and adapted to operate in a reflective mode when the lighting system is switched off. In emissive mode, the display unit has well defined saturated colors and high luminance. In out door use, they remain, still visible at moderate ambient light conditions, whereas, when ambient light becomes very intense, a typical situation a sunny day outdoors, the display will gradually appear as a grey-scale display, however, which is still possible to read. When the lighting system is switched off, the display operates in the reflective mode. In this mode, there is no color information, rendering the display to appear as a grey-scale display; however, it can display all information a color display can, but without colors.

Figure 2A:
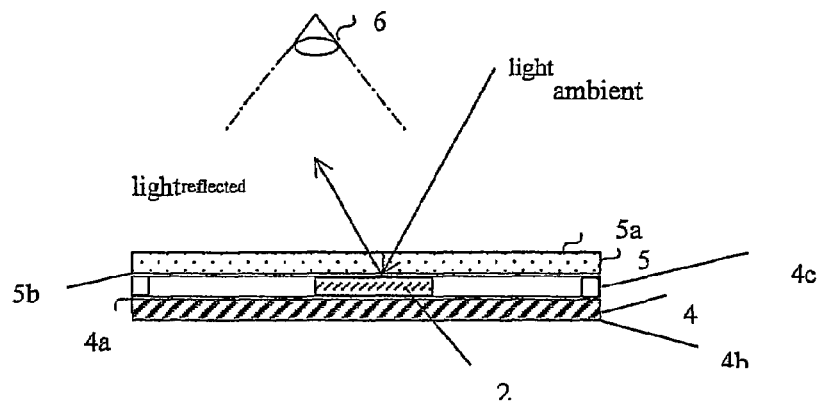
FIG. 2a is a sectional view of a display unit according to another embodiment of the invention, illustrating a situation when the lighting system is switched off.

For a better understanding of the underlying principle of the invention and/or reduction to practice, now is referred to FIG. 2a, which is a cross-sectional view of a second embodiment of the display unit according to the invention, in which embodiment the reflector is provided in the center of the front side of the filter layer.

In FIG. 2a, there is shown a display unit 1 comprising a transparent display layer 5, in this case an LC layer having a front side 5a and a rear side 5b. The front side 5a is turned to a user 6. Because of simplicity, a complete portable electronic device comprising a plurality of display units is not illustrated in this figure, since the intention is to explain the operating principle of the invention. Such an electronic device will be shown below with reference to FIG. 4.

Now, again turning to FIG. 2a, there is further provided a color filter layer 4 having a front side 4a facing the rear side 5b of the transparent display layer 5, which front side 4a is provided with a reflector 2 and distances 4c, in this particular embodiment provided by means of a so-called "black mask". Of course, also other types of distances can be employed without departing from the invention.

FIG. 2a shows the situation when the lighting system is switched off and the display unit 1 operates in the reflective mode (illustrated by an incoming and an outgoing arrow). As is shown, the light will, for the user 6, appear as reflected light $light_{reflected}$, reflected by the reflector 2. In this embodiment, the reflector 2 is provided in the center of the front side 4a of the color filter layer 4, when seen in cross-section, taken in a direction perpendicular to the front side 4a, as seen by the user 6, of the filter layer 4. This means that only part of the front side 4a is covered by the reflector 2. Depending on how large the area that is covered by the reflector is, reflective/emissive properties are changed as explained above. It is important to note that the area of the reflector 2 can typically be kept small compared to prior art techniques using color filters provided with metal reflectors on their rear sides, even compared to such a prior art color filter provided with hole through filter to improve reflection, since reflected light does not have to travel through the filter layer by using the principle of the invention.

Figure 2B:
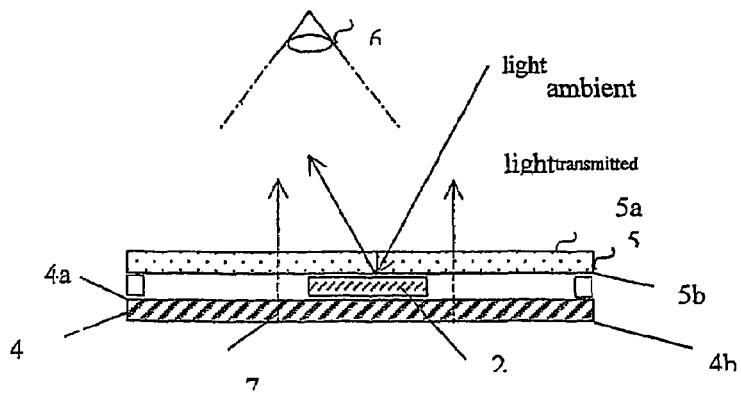

FIG. 2b shows the same display unit 1 when operating in emissive mode. As is shown, a lighting system 7 is now switched on, whereby light (illustrated by arrows denoted "$light_{backlight}$") travel through the color filter layer 4 before reaching the user 6. In this case a so-called "back-light" system is shown, illuminating the display layer 4 from the rear side 4b, but also other suitable lighting systems could be employed.

The reflector 2 can have rectangular, circular, or have other suitable shape, is not limited to only one reflector, or a particular pattern. It can also be provided as flakes, particles or almost any suitable shape.

The transparent display layer 5 can for instance be of conventional LC type having electrodes of indium tin oxide, enclosed in a glass closure. However, the type of display layer is not essential to the invention, any suitable type could be employed.

Pixel addressing schemes could be of any suitable conventional type, such as row or column addressing schemes, and will therefore not be further described in more detail. All driving circuits, typically comprising timing and control sub-units, column drivers and row drivers in order to drive an LCD could be designed according to known principles.

Color resolution of the display can be any suitable. When using a higher input resolution or an embedded gamma function, extra color resolution can be exploited.

Further embodiments of the invention will now be described, whereby because of simplicity only plan views illustrating the arrangement of color filters and electrode structure will be illustrated.

Figure 3A:
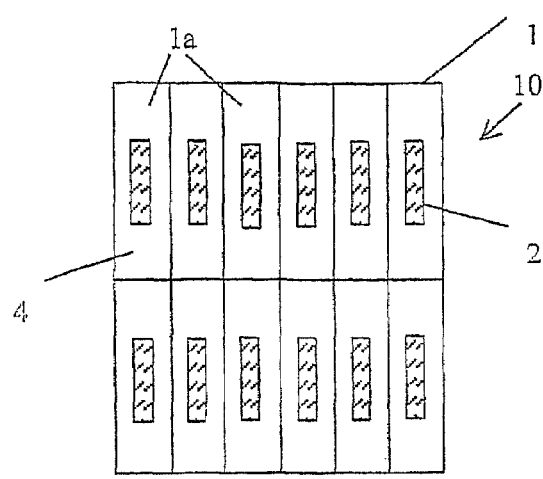
FIGS. 3a and 3b illustrate part of a display panel comprising a plurality of display units according to preferred embodiments of the invention.
Figure 3B:
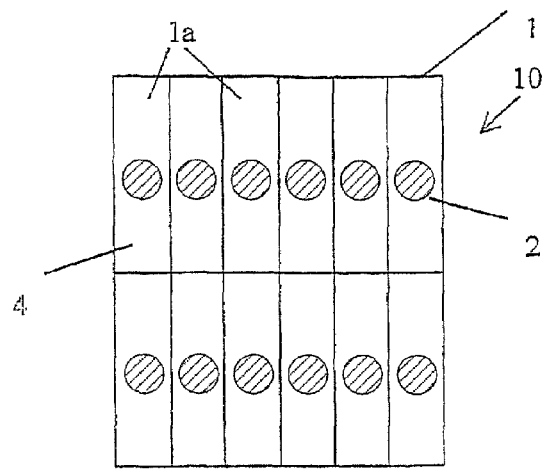
Figure 4:
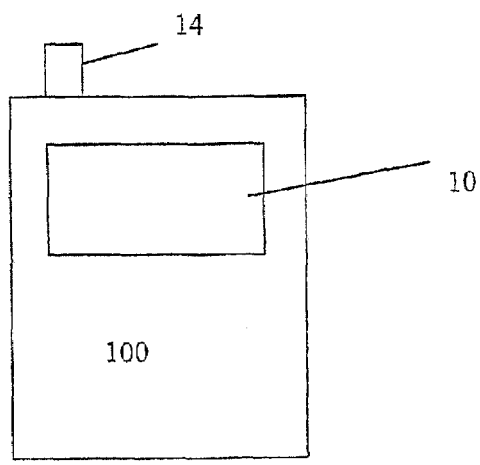
FIG. 4 is a portable electronic device in the form of a cellular phone including a display panel.

In FIG. 3a, part of a display 10 comprising display units 1 according to a preferred embodiment of the invention is shown in a plan view. Four sets of display units 1, each set 1a including three display units 1 (i. e. three different color filters 4, one for each color, red, green and blue) are shown. The color filters can also be combined in strips; however, this is not shown. Each color filter 4 is provided with a rectangular reflector 2 provided in the center thereof. Distances 4a, herein a black mask, is also provided, dividing the display panel 10 into the respective display units 1. The display units 1 can be multiplied to any suitable number of units 1 making up a complete display. Also, as shown in FIG. 3b, each color filter 4 may include a circular reflector 2 rather than the rectangular reflectors of FIG. 3a. The display including liquid crystal (LC) layer and lighting system (not shown) is then assembled in a portable electronic device such as a mobile phone, which is illustrated in FIG. 4. It is not necessary that the electronic device is able to communicate in the same way as a mobile phone, but any portable electronic device where there is a need for a better display could benefit from the invention.

FIG. 4 shows a portable electronic device 100, herein in the form of a cellular phone having an antenna 14, and display 10.

Experiments performed on an 128×160 dot, 65 k color display (1/160 duty (driving condition)) have revealed that surface brightness, reflectance and other parameters have improved compared to prior art.

The invention is not limited to pure emissive devices, but covers also transflective devices. The lighting system is not limited to backlighting only, but also other system are applicable.

Thus a display unit and a portable electronic device comprising the same, wherein two modes of operation is provided, that combines peak performance of an emissive display with a reflective display being able to be read without backlighting have been described. With the proposed display unit according to the invention, there is no need for reflected light to travel through a color filter when operating in reflective mode, without the lighting system turned on. The invention could be implemented in both passive (STNC) and active (TFT) devices (technology), in any type of portable electronic device such as clamshell or stick mobile phone, but also in the automotive industry, or any other stationary application requiring low power consumption.

The invention claimed is:

1. A display unit for a portable electronic device, comprising:
   a substantially transparent display layer having a front side for displaying information and a rear side;
   a color filter layer;
   at least one reflector between the color filter layer and the substantially transparent display layer such that no color filter is provided between the at least one reflector and the substantially transparent display layer; and
   a lighting system for illuminating the substantially transparent display layer from the rear side via the color filter layer, the lighting system configured to be switched on or off,
   wherein the display unit operates in an emissive mode when the lighting system is switched on, wherein the display unit operates in a reflective and/or transflective mode when the lighting system is switched off, and wherein the at least one reflector is on a front side of the color filter layer facing the display layer such that reflected light does not travel through a color filter when the display unit operates in the reflective mode.

2. A display unit according to claim 1, wherein the color filter layer is on the rear side of the substantially transparent display layer and the front side of the color filter layer faces the substantially transparent display layer, and wherein the front side of the color filter layer includes the at least one reflector.

3. A display unit according to claim 2, wherein the at least one reflector covers less than 50% of a total area of the rear side of the color filter layer.

4. A display unit according to claim 2, wherein the at least one reflector covers less than 25% of a total area of the front side of the color filter layer.

5. A display unit according to claim 3, wherein the at least one reflector is provided in a center of the front side of the color filter layer.

6. A display unit according to claim 3, wherein the at least one reflector is provided adjacent to an edge of the front side of the color filter layer.

7. A display unit according to claim 3, wherein the at least one reflector has a rectangular shape.

8. A display unit according to claim 3, wherein the at least one reflector has a circular shape.

9. A display unit according to claim 4, wherein the at least one reflector is provided in a center of the front side of the color filter layer.

10. A display unit according to claim 4, wherein the at least one reflector is provided adjacent to an edge of the front side of the color filter layer.

11. A display unit according to claim 4, wherein the at least one reflector has a rectangular shape.

12. A display unit according to claim 4, wherein the at least one reflector has a circular shape.

13. A display unit according to claim 5, wherein the at least one reflector has a rectangular shape.

14. A display unit according to claim 5, wherein the at least one reflector has a circular shape.

15. A display unit according to claim 6, wherein the at least one reflector has a rectangular shape.

16. A display unit according to claim 6, wherein the at least one reflector has a circular shape.

17. A portable electronic device comprising:
   at least one display unit, comprising:
   a substantially transparent display layer having a front side for displaying information and a rear side;
   a color filter layer;
   at least one reflector between the color filter layer and the substantially transparent display layer such that no color filter is provided between the at least one reflector and the substantially transparent display layer; and
   a lighting system for illuminating the substantially transparent display layer from the rear side, the lighting system configured to be switched on or off, wherein the display unit operates in an emissive mode when the lighting system is switched on, wherein the display unit operates in a reflective and/or transflective mode when the lighting system is switched off, and wherein the at least one reflector is on a front side of the color filter layer facing a user such that reflected light does not travel through a color filter when the display unit operates in the reflective mode.

18. A portable electronic device according to claim 17, wherein the color filter layer is on the rear side of the substantially transparent display layer and the front side of the color filter layer faces the substantially transparent display layer, and wherein the front side of the color filter layer includes the at least one reflector.

* * * * *